United States Patent
O'Neill et al.

[11] Patent Number: 6,079,193
[45] Date of Patent: Jun. 27, 2000

[54] IMPLEMENT SUSPENSION WITH LOST MOTION COUPLING

[75] Inventors: Michael Jerome O'Neill, Mayville; Larry Ray Radloff, Horicon; Matthew John Alles, Kewaskum, all of Wis.

[73] Assignee: Deere & Company, Moline, Ill.

[21] Appl. No.: 09/240,255

[22] Filed: Jan. 29, 1999

[51] Int. Cl.[7] ............ A01D 34/03; A01D 34/43; A01D 34/64
[52] U.S. Cl. ............ 56/17.1; 56/15.8; 56/15.9
[58] Field of Search ............ 56/15.1, 15.2, 56/15.7, 15.8, 15.9, 17.1, DIG. 3, DIG. 10, DIG. 22

[56] References Cited

U.S. PATENT DOCUMENTS

| | | | |
|---|---|---|---|
| 3,654,749 | 4/1972 | Ostergren et al. | 56/15.8 |
| 4,760,686 | 8/1988 | Samejima et al. | 56/15.8 |
| 4,869,057 | 9/1989 | Siegrist | 56/15.9 |
| 5,293,729 | 3/1994 | Curry et al. | 56/7 |
| 5,321,938 | 6/1994 | LeBlanc | 56/6 |
| 5,459,984 | 10/1995 | Reichen et al. | 56/7 |
| 5,475,971 | 12/1995 | Good et al. | 56/14.9 |
| 5,483,789 | 1/1996 | Gummerson | 56/15.5 |
| 5,715,667 | 2/1998 | Goman et al. | 56/13.6 |
| 5,813,203 | 9/1998 | Peter | 56/17.2 |
| 5,816,035 | 10/1998 | Schick | 56/15.2 |

OTHER PUBLICATIONS

Parts Catalog entitled "F710 and F725 Front Mowers", pp. G20 and A2, published by Deere & Company in the U.S.A. in Aug., 1998.

Parts Catalog entitled "50–60–72– and 76–Inch Front Mount Mowers", pp. B5 and B13, published by Deere & Company in the U.S.A. in Apr., 1997.

*Primary Examiner*—Robert E. Pezzuto
*Assistant Examiner*—Arpad Fabian Kovacs

[57] ABSTRACT

A suspension for supporting an implement on a vehicle includes a transversely extending pivot shaft secured to a frame of the vehicle and a support link swingably mounted on the pivot shaft at one end portion. A second end portion of the support link extends therefrom in a fore-and-aft direction. Two spaced-apart, fore-and-aft extending support arms are also swingably secured to the pivot shaft at one end portion and are connected at another end portion to opposite sides of the implement. A lift member is coupled to the frame of the vehicle at a first end portion and to the support link at a second end portion for swinging the link about the pivot shaft. A lost motion coupling is provided between a midportion of each of the two support arms and the second end portion of the support link. The lost motion coupling includes a pin and an oversized sleeve for receiving the pin. One of the pin and the sleeve is fixed to the midportion of each of the support arms and the other of the pin and the sleeve is fixed to the second end portion of the support link to permit limited independent up and down movement of the support arms without requiring corresponding movement of the support link.

17 Claims, 5 Drawing Sheets

IMPLEMENT SUSPENSION WITH LOST MOTION COUPLING

BACKGROUND OF THE INVENTION

1. Field of the Invention

This invention relates to an implement suspension for a vehicle-mounted implement and more particularly, in the preferred embodiment, to a mower deck.

2. Description of Related Art

In grounds care applications, vehicles are typically coupled with some sort of additional implement. For example, mower decks, front blades, and other customary implements are commonly used. Often the implements are either comparatively fixedly mounted to the frame of the vehicle, allowing little or no side-to-side articulation of the implement, or they may be provided with a suspension including a mechanism which allows for some amount of side-to-side articulation of the implement to permit the implement to follow the contour of the ground over which it passes.

One conventional implement suspension utilizes a single lift cylinder to raise and lower an implement. A pair of lift arms are swingably connected to the vehicle at one end and coupled to the implement at another. The lift arm is pinned to a lift link extending between the two lift arms. A degree of side-to side articulation of the implement is accomplished by using ball joints at each end of the lift arms where the arms are connected to the vehicle and the implement. However, there is a perceived lack of control when the implement is raised by the lift cylinder, in that the capacity for side-to-side articulation is not sufficiently diminished after the implement leaves the ground.

Another conventional implement suspension makes use of two lift cylinders which are connected to an implement at opposite ends thereof to raise and lower the implement to a desired position. As the vehicle and implement travel over the ground, the two lift cylinders may be placed in "float", whereby the cylinders are permitted to freely extend and compress within their normal limits of travel, thereby enabling the implement to articulate from side-to side in that the opposite ends of the implement may move up or down independently to follow the contour of the ground. However, the use of two lift cylinders represents a substantial increase in cost and maintenance over a suspension which uses a single lift cylinder.

SUMMARY OF THE INVENTION

It is an object of the present invention to provide an improved implement suspension for supporting an implement attached to a vehicle.

It is also an object of the present invention to provide a lost motion coupling as part of such an implement suspension to allow additional side-to-side articulation of an implement while using only one lift member for fluidly raising and lowering the implement.

It is another object of the present invention to provide such a lost motion coupling having a simple configuration.

It is a further object of the present invention to control the cost of an implement suspension while increasing its capacity for side-to-side articulation.

These and other objects are achieved by providing an implement suspension wherein two support arms are each swingably mounted at one end to a pivot shaft connected to the frame of a vehicle and each connected at their other end to opposite sides of the implement. A support link is swingably mounted at one end to the pivot shaft and at the other end is connected to a lift member. The lift member is connected to the frame of the vehicle at an end opposite its connection to the support link.

A lost motion coupling is provided between the support link and the two support arms at a location spaced from the pivot shaft in the fore and aft direction. The lost motion coupling includes, between each arm and the support link, a pin positioned within an oversized sleeve. The lost motion permits limited independent movement of the support arms and therefore side-to-side articulation of the implement in that opposite sides of the implement may take advantage of the limited independent movement of the support arms to which they are connected.

DETAILED DESCRIPTION

Figure 1:
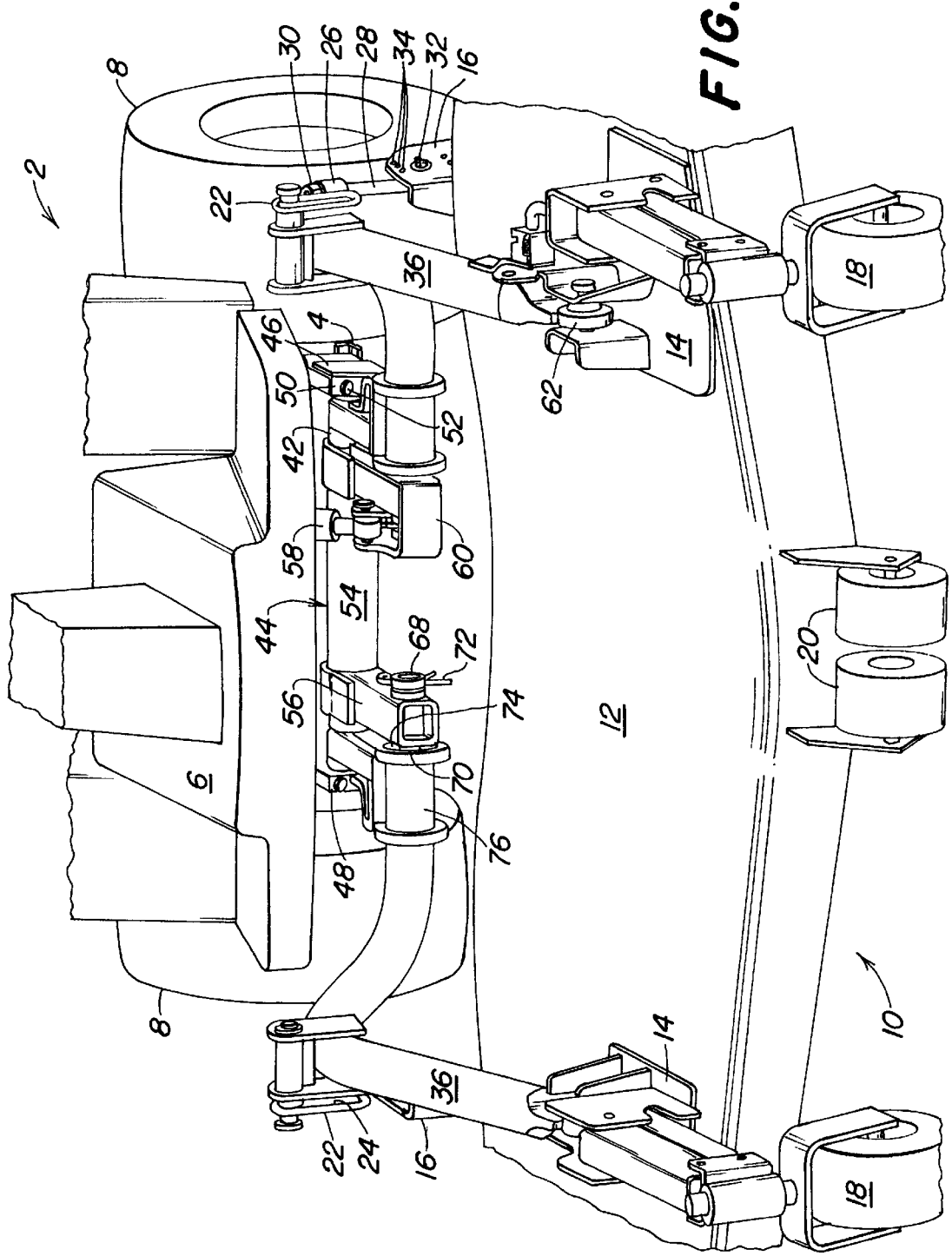
FIG. 1 is a fragmentary perspective view of an implement suspension according to the present invention shown mounting a mower deck to a tractor.

A drive vehicle 2 of conventional manufacture is partly illustrated in FIG. 1. The vehicle 2 includes a frame 4 and a vehicle body 6 operably carried by a set of four wheels 8 with only the front wheels showing in FIG. 1. The vehicle 2 may be any conventional type self-propelled, multi-wheeled or tracked vehicle or tractor or the like and which can operably maneuver during use under the control of an operator. The vehicle 2 will normally include at least two wheels which are turnable by an operator by movement of a steering wheel or joy stick. The turning wheels may be the front wheels, the rear wheels or all four wheels.

The frame 4 of the vehicle 2 is adapted for carrying an implement such as the front mounted mower deck 10 shown in FIG. 1. The mower deck 10 includes a deck housing 12 which will typically cover a plurality of rotary mower blades coupled to a driving mechanism (not shown). The driving mechanism in turn may be coupled, for example, to a PTO shaft or to a hydraulic system of the drive vehicle 2. The deck housing 12 includes a pair of support arm mounting brackets 14 and a pair of rear height adjustment plates 16, with one of each being mounted on opposite sides of the deck housing 12.

A pair of caster wheels 18 are mounted on opposite sides of the front of the deck housing 12. In order to permit the deck 10 to closely follow the contour of the ground as the vehicle 2 and attached deck 10 move over the ground, the rear of the deck housing 12 may include additional features such as antiscalp rollers (such as the rollers 20 depicted on the front of the deck housing 12) or gauge wheels (not shown) which are known in the art. Preferably, the deck 10 is configured and suspended from the frame 4 of the vehicle 2 so the wheels 8 of the vehicle 2 follow closely behind the rear of the deck housing 12 so that a need for rear casters is eliminated.

Figure 2:
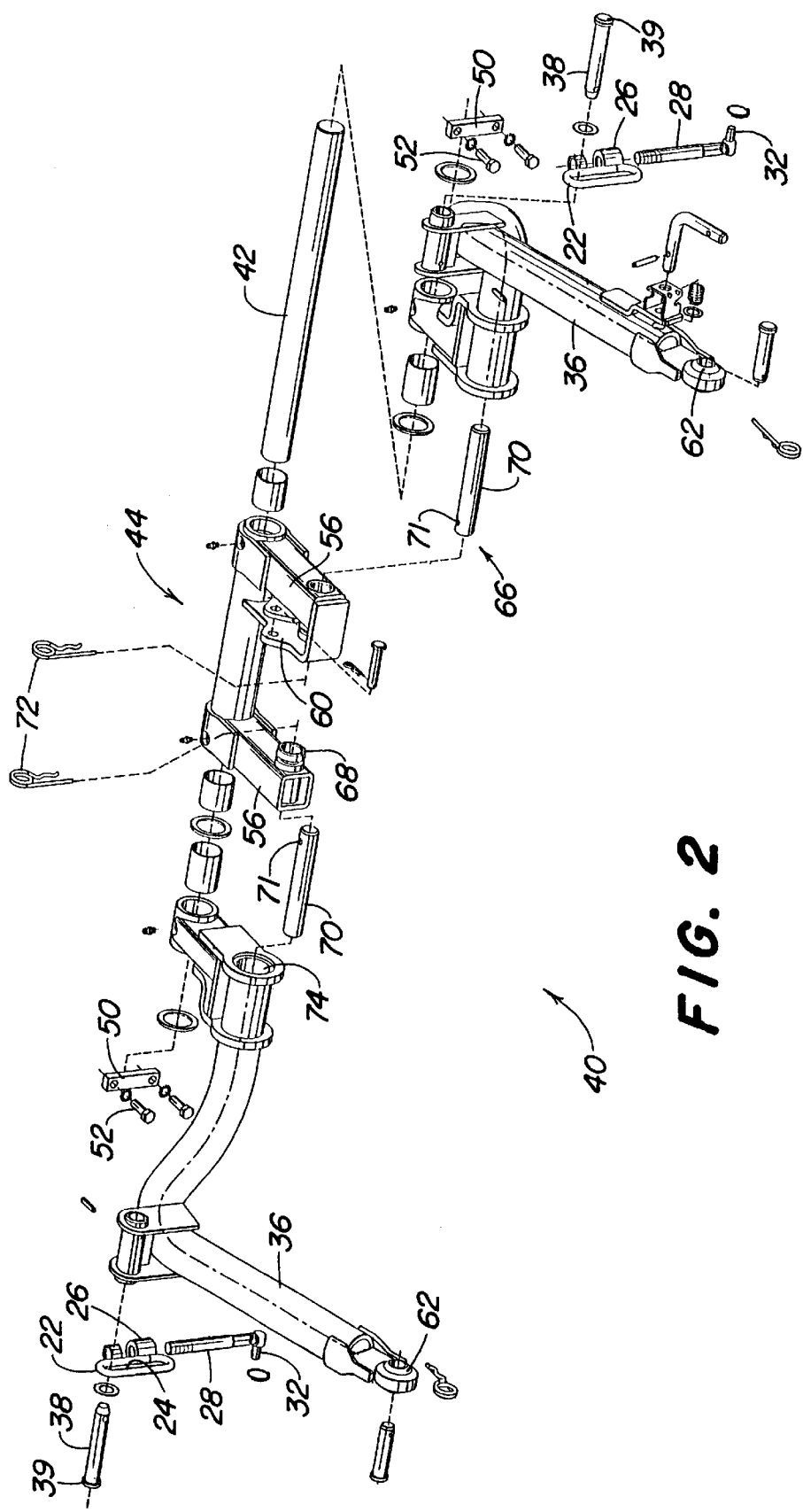
FIG. 2 is an exploded view of the implement suspension shown in FIG. 1.

Referring now to FIGS. 1 and 2, the deck 10 also includes height adjustment apparatus for setting the cutting height on both sides of both the front and rear of the deck 10. The front cutting height may be adjusted by conventional methods such as addition or removal of spacers (not shown) at the point of attachment of the casters 18 to the deck housing 12. The rear height adjustment includes at each side of the deck 10 an oblong hanger 22 having an elongated slot 24. On each side, the oblong hanger 22 is welded to an internally threaded sleeve 26 which receives a threaded portion of an L-shaped rod 28. A lock nut 30 retains a desired relationship between the rod 28 and the hanger 22. A base leg 32 of the L-shaped rod 28 is positioned in one a various holes 34 in the a rear height adjustment plate 16 which is rigidly mounted on the deck housing 12. The hanger 22 is coupled to a support arm 36 by a rear suspension pin 38 having a flanged end 39 which is inserted into the elongate slot 24 of the hanger 22. This arrangement sets a minimum height of the rear of the deck 10 while allowing some degree of front-to-rear articulation as well as a limited amount of side-to-side articulation of the deck 10.

Reference numeral 40 designates generally an implement suspension according to the present invention. The suspension 40 serves to support the deck 10 and to secure the deck 10 to the frame 4 of the vehicle 2. The suspension 40 is shown in exploded fashion in FIG. 2 and includes a transverse pivot shaft 42 over which the two support arms 36 and a C-shaped support link 44 are swingably mounted. As shown in FIG. 1, the pivot shaft 42 is secured to the frame 4 of the vehicle 2 at a portion of the frame 4 including two mounting blocks 46 having U-shaped channels 48 into which the pivot shaft 42 is positioned. Retainer plates 50 are secured over the channels 48 by bolts 52 to keep the pivot shaft 42 in position.

The support link 44 has a hollow base leg 54 which may is slid over the pivot shaft 42, and two side legs 56 which extend forwardly from the pivot shaft 42. A hydraulic lift cylinder 58 of conventional design is pinned at one end to a mounting bracket 60 on one of the side legs 56 of the support link 44 and at another end to the frame 4 of the vehicle 2.

At an end of each support arm 36 opposite the end of the support arm 36 mounted to the pivot shaft 42, a ball joint 62 serves as a universal coupling to join the arm 36 to the deck housing 12 while allowing limited relative movement. A pin 64 secures the ball joint 62 (and attached arm 36) to the deck 10 at a corresponding one of the support arm mounting brackets 14.

The implement suspension 40 includes a lost motion coupling 66 to permit limited independent movement of each of the support arms 36 with respect to the support link 44. The lost motion coupling 66 includes openings 68 in a midportion of each side leg 56 of the support link 44 through which pins 70 are positioned. The pins 70 each have a crossbore 71 through which cotter pins 72 are positioned to secure the pins 70 in place. A corresponding opening 74 in an adjacent portion of each of the support arms 36 allows the pins 70 to be received in the arms 36 so that the hollow interior of each of the arms 36 acts as a sleeve for receiving a corresponding pin 70. As shown in FIG. 1, the openings 74 comprise the hollow interior of a transversely extending portion 76 of each of the support arms 36. In a preferred embodiment, the openings 74 have an interior diameter of 1.75 inches while each of the pins 70 has an outer diameter of 1 inch. Various sizes of pins 70 may be used with a given size opening 74 to achieve desired degree of side-to-side articulation, as The degree of clearance between the opening 74 and the pin 70 will dictate the amount of side-to-side articulation attainable by the implement. The amount of vertical displacement permitted at each side of an implement will depend on the distance between the lost motion coupling 66 and the outer end of the implement. Lateral space between outer ends of implement outward and the lost motion coupling 66 presents a geometry allowing greater motion at the ends of the implement than is available at the lost motion coupling 66 between the pin 70 and the opening 74.

Figure 3:
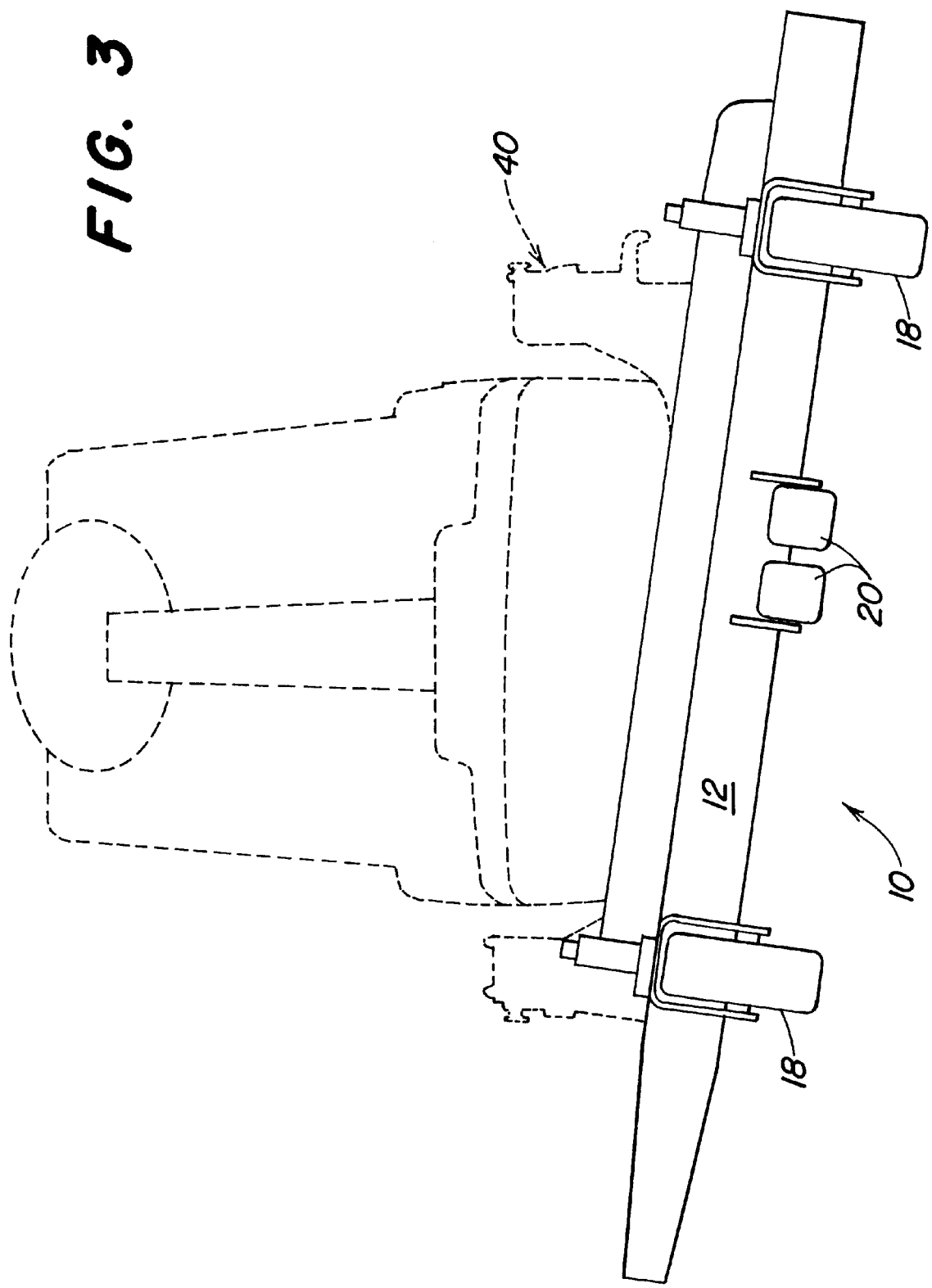
FIG. 3 is a front view of a mower deck showing side-to-side articulation capability of the implement suspension of FIG. 1.
Figure 4:
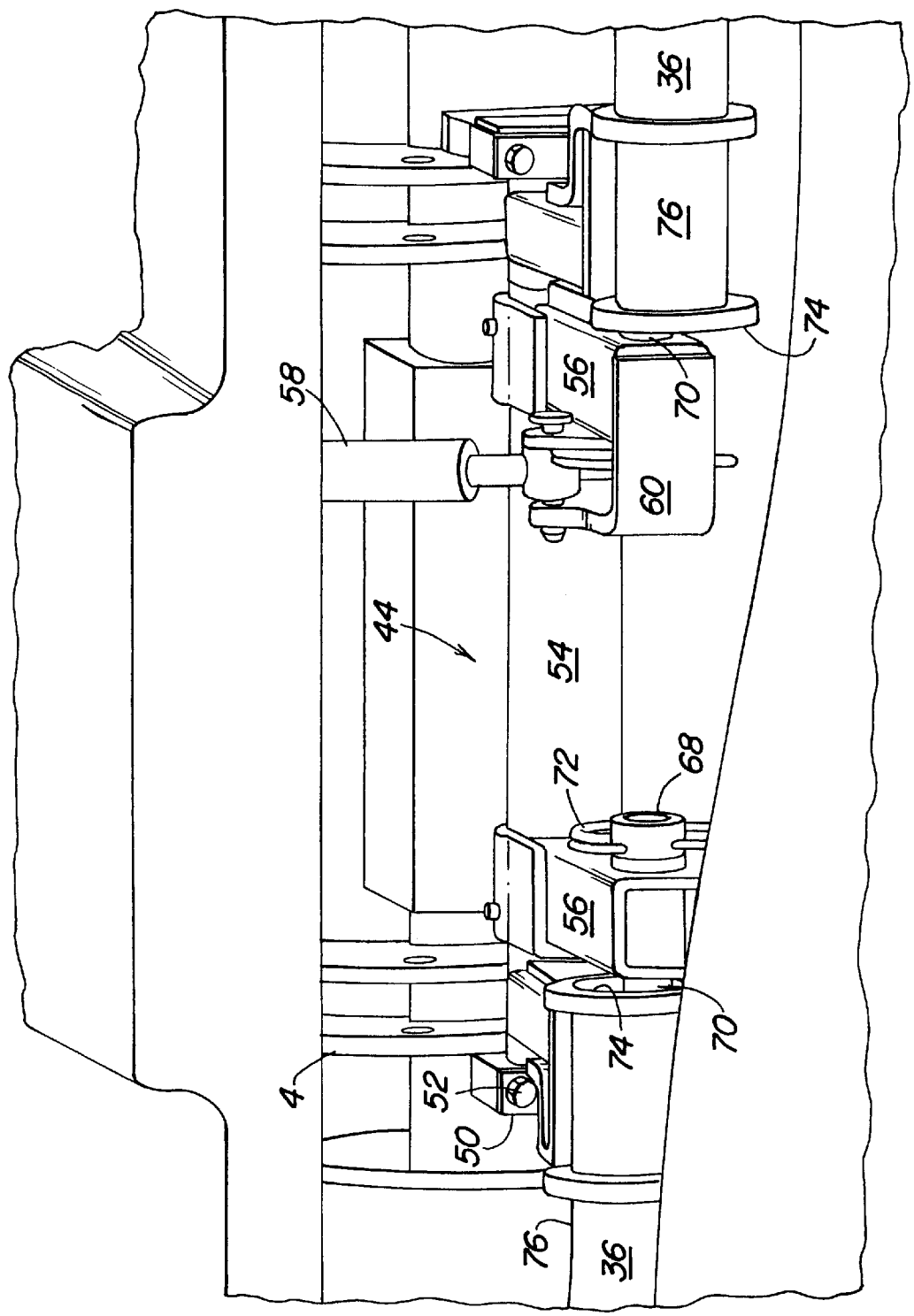
FIG. 4 is an enlarged view of the implement suspension showing the position of the lost motion coupling when the mower deck is in the position shown in FIG. 3.

FIGS. 3 and 4 illustrate a typical degree of side-to-side articulation of the deck 10 which may be experienced during operation. FIG. 3 shows side-to-side articulation of a deck 10 wherein the right-hand side (as viewed by an operator) of the deck 10 is elevated (e.g. to follow the contour of the ground). FIG. 4 shows the position of the support link 44 and lost motion coupling 66 when the deck 10 experiences the side-to-side articulation shown in FIG. 3. The pin 70 corresponding to the right-hand side of the deck 10 (on the left-hand side of the figure) is engaged with the bottom of its corresponding opening 74, while the and pin 70 corresponding to the left-hand side of the deck 10 (on the right-hand side of the figure) is at top of its corresponding opening 74. Therefore, further right-hand side elevation may not be obtained by the deck 10 via the lost motion coupling 66 unless the left-hand side is raised by the same or greater amount.

Figure 5:
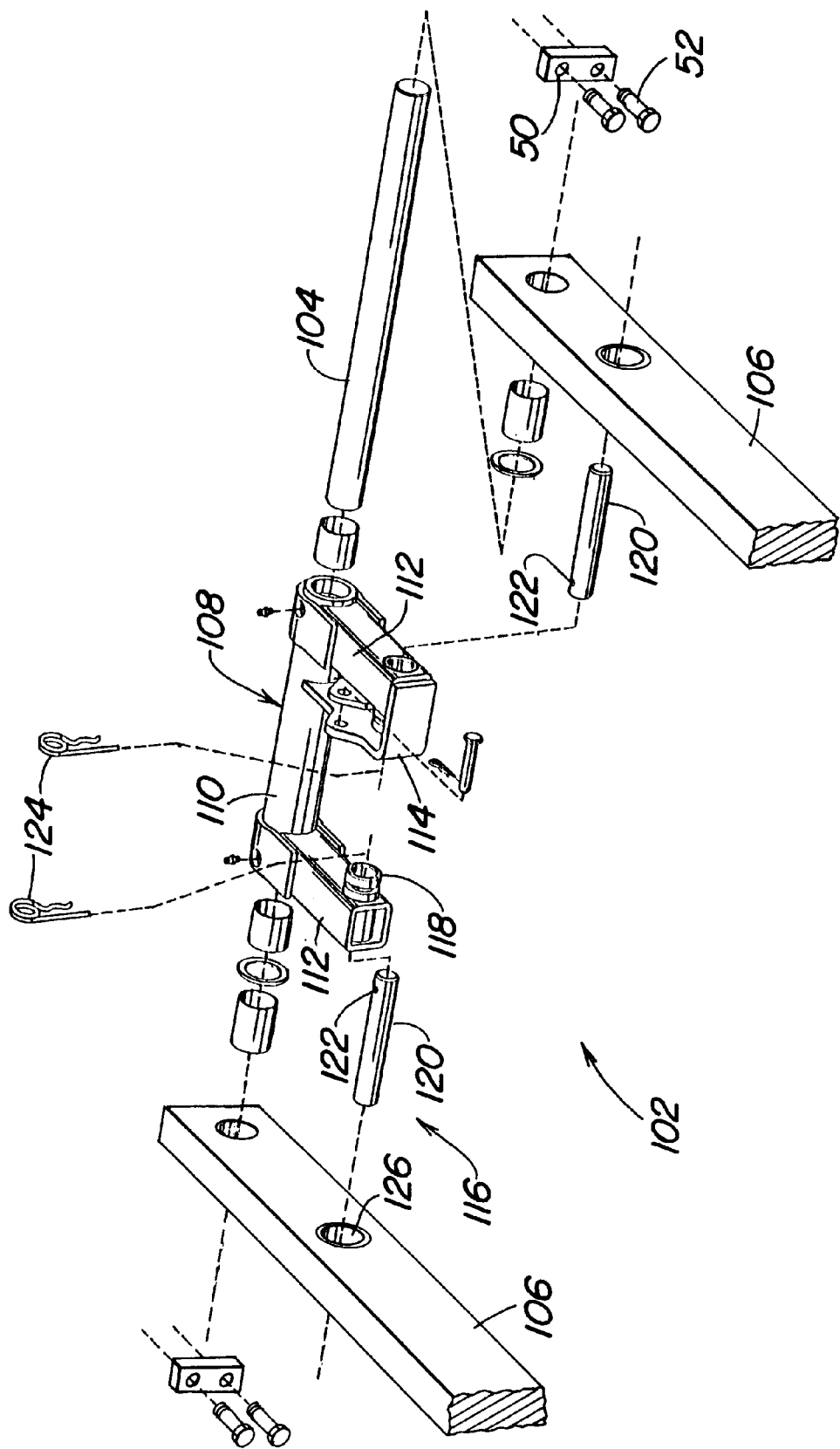
FIG. 5 is an exploded view of an implement suspension according to an alternate embodiment of the present invention.

An alternate embodiment of the present invention is shown in FIG. 5. The implement suspension 102 of FIG. 5 is adapted, for example, for use with an implement such as a front blade. The suspension 102 contains many of the same members as the suspension shown in FIGS. 1–4 including a transverse pivot shaft 104 over which two pusher bars 106 and a C-shaped support link 108 are swingably mounted. The pivot shaft 104 may be similarly secured to the frame 4 of a drive vehicle 2.

The support link 108 has a hollow base leg 110 which may is slid over the pivot shaft 104, and two side legs 112 which extend forwardly from the pivot shaft 104. A lift member such as a hydraulic cylinder (not shown) of conventional design may be pinned at one end to a mounting bracket 114 on one of the side legs 112 of the support link 108 and at another end to the frame 4 of the vehicle 2.

At an end of each pusher bar 106 opposite the end of the pusher bar 106 mounted to the pivot shaft 104, a coupling of conventional design may be mounted for connecting an implement to the bars 106.

The implement suspension 102 includes a lost motion coupling 116 to permit limited independent movement of each of the pusher bars 106 with respect to the support link 108. The lost motion coupling 116 includes openings 118 in a portion of each side leg 112 of the support link 108 spaced from the pivot shaft 104, through which a pin 120 is positioned. The pins 120 each have a crossbore 122 through which cotter pins 124 are positioned to secure the pins 120 in place. An oversized crossbore 126 in an adjacent portion of each of the pusher bars 106 allows the pins 120 to be received in the bars 106.

The lost motion coupling 116 functions as the coupling 66 described with reference to FIGS. 1–4 in allowing side-to-side articulation, except that the pins 120 interact with oversized crossbores 126 in each of the pusher bars 106 rather than in the opening 74 formed in a laterally extending portion 76 of the support arms 36.

Again, when the lift member is actuated for the purpose of raising the implement, the first movement of the member will result in travel by each of the pins 120 within their corresponding crossbores 126 until they engage the material of the pusher bars 106, after which the pusher bars will rotate about the pivot shaft 104, raising the attached implement evenly.

Although the invention is described with reference to illustrative embodiments for use with front-mounted implements, it will be understood by those skilled in the art that the invention may be advantageous in the form described or as modified for use in other applications wherein it is desirable to increase side-to-side articulation of a suspended implement.

For instance, the pin of the lost motion coupling could extend from a support arm into larger opening of the support link rather than a sleeve being located on each of the support arms and the pin being fixed to the support link.

The present invention should not be limited by the above-described embodiments, but should be limited solely by the claims that follow.

We claim:

1. A suspension for supporting an implement on a vehicle, said vehicle having a frame and the implement having first and second sides terminating at laterally spaced outer ends, said suspension comprising:

a transversely extending pivot shaft secured to the frame;

a support link having first and second end portions, the first end portion swingably mounted on said pivot shaft and the second end portion extending therefrom in a fore-and-aft direction;

first and second transversely spaced-apart, fore-and-aft extending support arms, said support arms having first and second end portions;

an implement suspension connection securing the second end portion of each of the first and second support arms to the implement;

a further coupling swingably securing the first end portions of each of the first and second support arms with the pivot shaft;

a lift member having first and second end portions, the first end portion coupled to the frame of the vehicle and the second end portion coupled to the support link for swinging the link about the pivot shaft; and a lost motion coupling provided between a midportion of each of the first and second arms and the second end portion of the support link, said lost motion coupling including a pin and an oversized sleeve adapted for receiving the pin, one of said pin and said sleeve fixed to the midportion of each of the first and second support arms and the other of said pin and said sleeve fixed to the second end portion of the support link to permit limited independent up and down movement of said arms without requiring corresponding movement of the support link.

2. The implement suspension of claim 1 wherein the lost motion coupling includes two oversized sleeves, each of the sleeves fixed to a midportion of a corresponding one of the first and second support arms, and the pin is fixed to the second end portion of the support link.

3. The implement suspension of claim 2 wherein the pin extends transversely from the support link and wherein the each of the sleeves comprises an opening in a midportion of one of the first and second support arms, each of said sleeves having an axis therethrough extending transversely for receiving the pin.

4. The implement suspension of claim 3 wherein each of the sleeves has an inner diameter of about 1.75 inches and the pin has a diameter of about 1 inch.

5. The implement suspension of claim 3 wherein the pin is removably fixed to the support link to permit substitution of various other diameter pins therefor.

6. The implement suspension of claim 1 wherein the support link is generally c-shaped and includes a base leg swingably secured on the pivot shaft, and two spaced-apart side legs extending from the base leg forwardly from the pivot shaft.

7. The implement suspension of claim 6 wherein the lost motion connection includes two pins, each fixed to and extending from a corresponding side leg of the support link into sleeves fixed to a midportion of each of the first and second support arms.

8. The implement suspension of claim 1 wherein the lift member is a powered lift cylinder connected between the link and frame.

9. The implement suspension of claim 8 wherein the powered lift cylinder is a hydraulic cylinder.

10. The implement suspension of claim 1 wherein the suspension is further provided between arm and implement oblong hanger limiting relative movement between arm and implement at a rear portion of the implement.

11. The implement suspension of claim 1 wherein the implement is a mower deck.

12. The implement suspension of claim 1 wherein the implement suspension connection is a universal coupling.

13. A suspension for supporting an implement on a vehicle, said vehicle having a frame and the implement having first and second laterally spaced outer ends, said suspension comprising:

a transversely extending pivot shaft secured to the frame;

a support link having first and second end portions, the first end portion swingably mounted on said pivot shaft and the second end portion extending therefrom in a fore-and-aft direction;

first and second transversely spaced-apart, fore-and-aft extending support arms, said support arms having first and second end portions;

a universal coupling securing the second end portion of each of the first and second support arms to the implement;

a further coupling swingably securing the first end portions of each of the first and second support arms with the pivot shaft;

a height adjustment including a hanger having an elongated slot and a slot following pin having a flanged end, one of said pin and said hanger fixed to the first and second support arms and the other of said pin and said hanger fixed to a rear portion of the implement, said pin captured in the elongated slot by the flanged end of the pin for operably suspending the rear of the implement from the first and second support arms.

a lift member having first and second end portions, the first end portion coupled to the frame of the vehicle and the second end portion coupled to the support link for swinging the link about the pivot shaft; and a lost motion coupling provided between a midportion of each of the first and second arms and the second end portion of the support link, said lost motion coupling including a pin and an oversized sleeve adapted for receiving the pin, one of said pin and said sleeve fixed to the midportion of each of the first and second support arms and the other of said pin and said sleeve fixed to the second end portion of the support link to permit limited independent up and down movement of said arms without requiring corresponding movement of the support link.

14. The implement suspension of claim 13 wherein the lost motion connection includes two pins, each fixed to and extending from a corresponding side leg of the support link into sleeves fixed to a midportion of each of the first and second support arms.

15. The implement suspension of claim 13 wherein the lift member is hydraulic cylinder.

16. The implement suspension of claim 13 wherein the implement is a front-mounted mower deck.

17. The implement suspension of claim 13 wherein the sleeve is an opening extending transversely into each of the first and second fore-and-aft extending support arms.

* * * * *